Nov. 26, 1935.    E. RIMAILHO    2,022,217
METHOD FOR SECURING AND TENSIONING RESILIENT SPOKES FOR
WHEELS PROVIDED WITH A SUSPENDED HUB
Filed June 21, 1934    3 Sheets-Sheet 1

E. Rimailho
INVENTOR
By: Marks & Clerk

Nov. 26, 1935.  E. RIMAILHO  2,022,217
METHOD FOR SECURING AND TENSIONING RESILIENT SPOKES FOR
WHEELS PROVIDED WITH A SUSPENDED HUB
Filed June 21, 1934  3 Sheets-Sheet 2
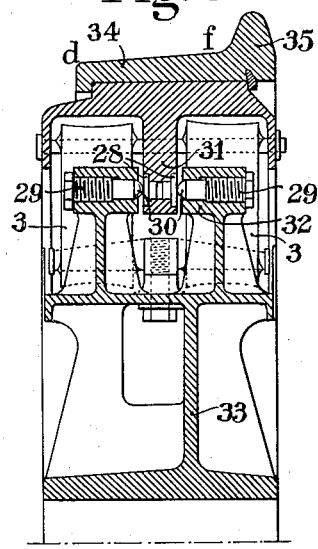
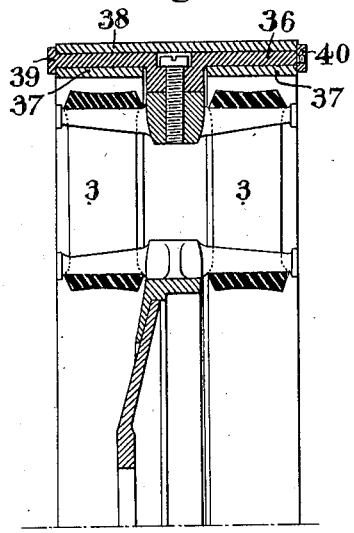
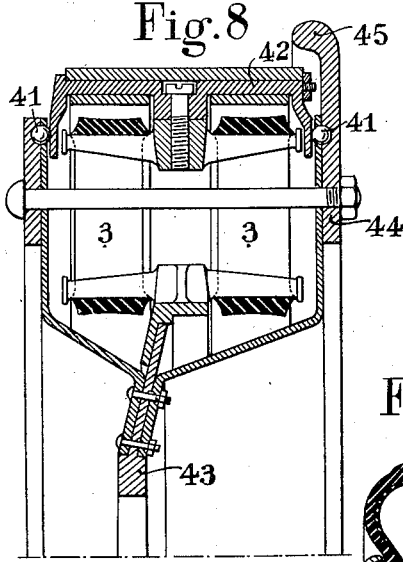
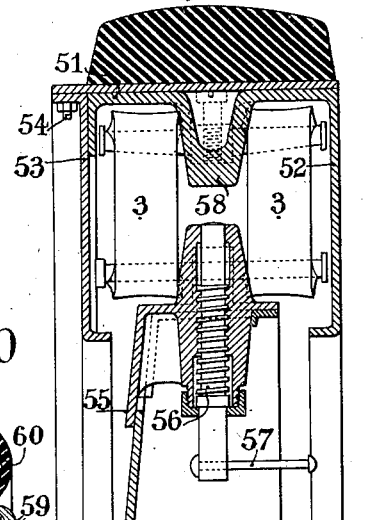
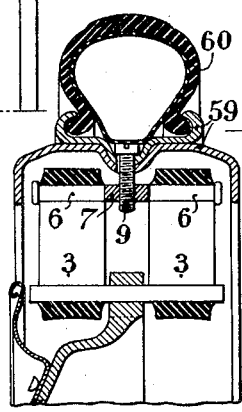
E. Rimailho
INVENTOR
By Marks & Clerk
ATTYS.

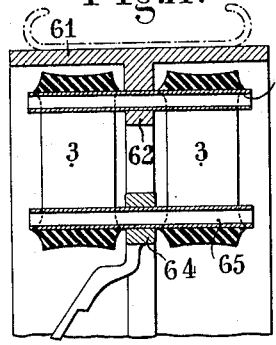
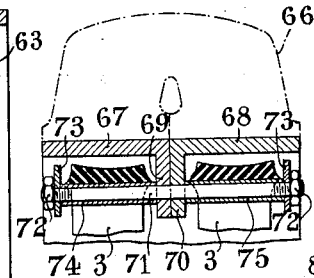
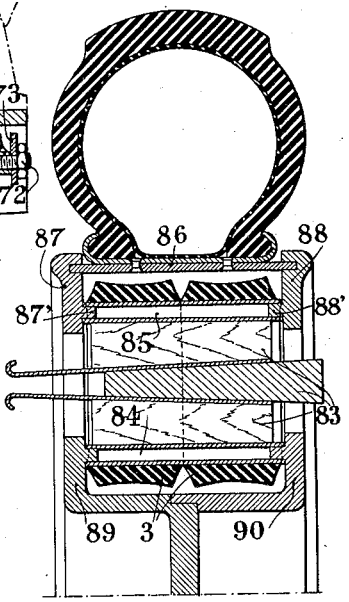
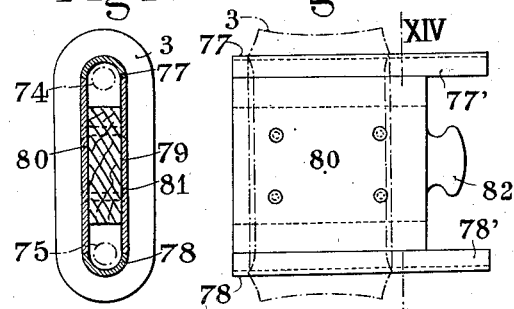
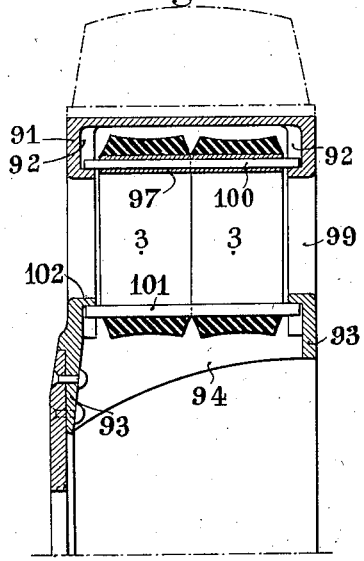
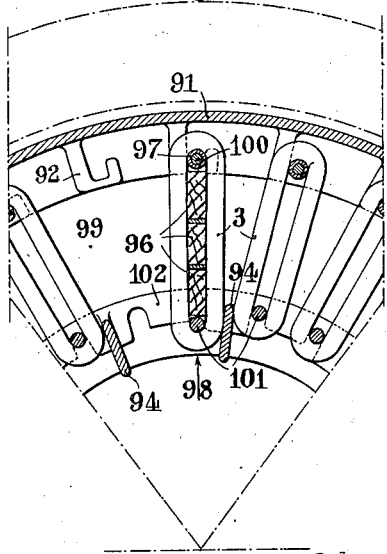

Patented Nov. 26, 1935

2,022,217

UNITED STATES PATENT OFFICE 2,022,217

METHOD FOR SECURING AND TENSIONING RESILIENT SPOKES FOR WHEELS PROVIDED WITH A SUSPENDED HUB

Emile Rimailho, Paris, France

Application June 21, 1934, Serial No. 731,730
In France July 8, 1933

5 Claims. (Cl. 157—1)

In a wheel having resilient spokes constituted for instance by rubber rings radially tensioned, the circular outer rim may be either rigid, or flexible, and, in the latter case, it may for instance comprise a weldless circular blade made of spring steel. In either case, the resilient spokes are secured, on the one hand, to the rim and, on the other hand, to the hub, and are tensioned between these two members.

The present invention has for its object an improved device adapted to tension and secure the said spokes.

These operations are effected for instance by means of two securing members inserted in the ring constituting the spoke, when this ring is at rest, and subsequently spaced apart, either by an instrument having two branches acting as scissors or as the jaws of a parallel vice, or by screw-threaded rods screwing in either of the said securing members for spacing them apart by stretching the sides thus flattened of the ring between two fixed members, which can be either the outer rim and the hub, or two tools; in the latter case, a wedge composed of a plurality of sections is inserted between the securing members for holding them apart until final placing in position. The possibility of adjusting, even during use, by screwing or unscrewing the screw-threaded rods, the initial tension of the rings, procures an advantage comparable to that obtained by more or less inflating a pneumatic tyre.

Various forms of carrying out the subject-matter of the invention will be hereinafter described, with reference to the accompanying drawings given by way of example only and in which the various figures illustrate these forms of construction in radial section.

Fig. 6 shows a device utilizing the standard rim of railway vehicles.

Figs. 7 and 8 illustrate devices for securing and tensioning rings on wheels having a flexible circular rim, made of spring steel. The wheel shown in Fig. 7 is adapted to run on the ground, and that shown in Fig. 8 on rail.

Fig. 9 shows a gun-carriage wheel.

Fig. 10 illustrates a wheel provided with a pneumatic tyre.

Figs. 11 and 12 are partial cross sections of wheels having rims of T cross section.

Figs. 13 and 14 are an elevation and a section made according to line XIV—XIV, showing a device for placing a ring in position.

Figs. 15 and 16 are partial cross sections of two forms of construction of wheels, the rim and hub of which are each provided with two side cheek members.

Fig. 17 is a section made according to the median plane of the wheel illustrated in Fig. 16.

Figure 1:
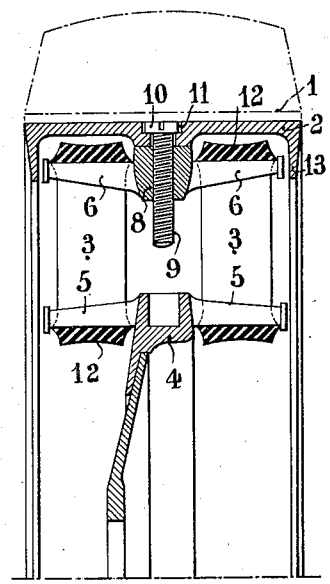
Figs. 1, 2, 3, are partial cross sections of wheels provided with a solid or hollow rubber tyre removably fitted on a rigid outer rim.
Figure 3:
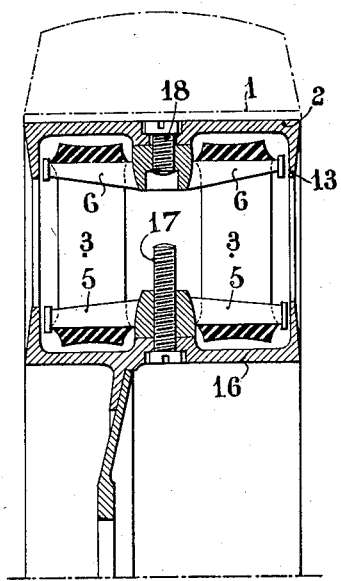
Figure 2:
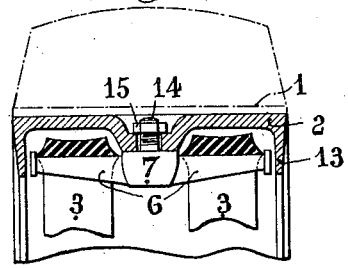

In Figs. 1, 2, and 3, I designates a removable wheel carrying a solid, semi-pneumatic or pneumatic tyre.

When this removable wheel is removed, the outer ring 2 of the rigid rim is visible.

In the form of construction shown in Fig. 1, the resilient rings 3 constituting the spokes are attached to the inner ring 4 by arms 5 projecting from the sides of this ring 4; these arms may be cast with the ring 4, or they may be secured thereto by any suitable means.

The attaching members of the outer part are constituted by arms 6, rigid with radially movable members 7. For that purpose, each of these members 7 is radially perforated with a threaded axial hole 8 in which a bolt 9 is screwed, the head 10 of which bolt bears on the outer ring 2 at the bottom of a cylindrical recess 11 provided in this ring.

When the bolts 9 are unscrewed, the arms 6 move towards the arms 5 until the outer edges 12 of the rings 3 have moved down lower than protecting ledges 13, which are formed on the sides of the ring 2 and, normally, laterally cover the arms 6.

The rings 3 can then be laterally removed, replaced by other rings which are threaded on the arms 5, 6, then re-tensioned by screwing in the bolts 9.

According to the form of construction illustrated in Fig. 2, the tensioning bolt 14 is rigid with the member 7 carrying the arms 6 and the adjustment is obtained by means of a nut 15 screwed on said bolt 14.

In the form of construction shown in Fig. 3, the inner arms 5 are arranged in the same manner as the arms 6, and can, as the latter, be radially moved; for that purpose, they are connected to an inner ring 16 by bolts 17 similar to the bolts 9 of Fig. 1. The tensioning of the spokes 3 can thus be effected either by means of outer bolts 18, or by means of the inner bolts 17 to which access may be had even during use, or finally by means of two groups of bolts concurrently employed, according to convenience in the assemblage or adjustment.

Figure 4:
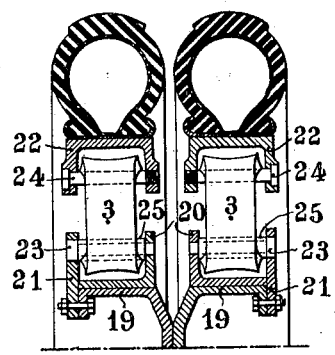
Fig. 4 is a cross section of a wheel having twin pneumatic tyres.

In the form of construction shown in Fig. 4, the inner ring 19 is lined on either side with a ring 20 of right-angled cross section and with a removable annular cheek member 21.

About each ring 20, 21 thus having a U cross section is arranged an outer ring or rim 22 also having a U cross section. Across these rings are respectively secured pins 23 and 24 holding the resilient rings 3 in stretched condition.

For assemblage, the following method of procedure is adopted:

Before securing the cheek member 21 to the ring 20, the rings 3 are placed on the pins 24 when the latter are secured on the rim 22; then, in these rings 3 are inserted tubes 25 and wedges (not shown) which temporarily hold the pins 24 and tubes 25 at the required distance apart. The pins 23, previously secured to the cheek member 21, are then inserted in the tubes 25 and the said pins 23 are fitted into the corresponding holes of the ring 20; then the cheek member 21 is secured to the ring 20 and the wedges, which are now no longer necessary for holding the rings 3 in a stretched condition are removed.

Figure 5:
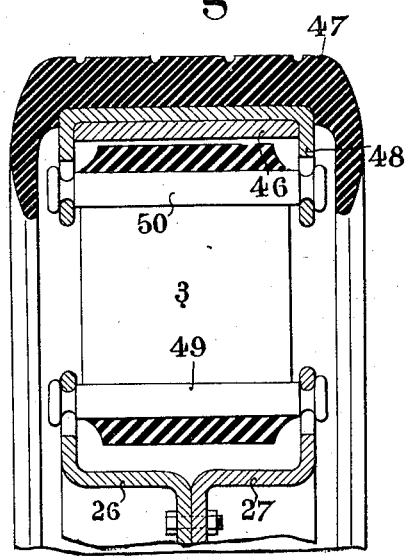
Fig. 5 shows a wheel having a flexible tyre made of steel and embedded in a rubber tyre.

The parts may be secured in the same manner in the device illustrated in Fig. 5, in which the hub is constituted by two separable elements 26, 27 which are drawn together upon assemblage.

Fig. 5 illustrates a wheel in which a single blade 46, made of spring steel, constitutes the flexible rim, provided with a rubber tyre 47. This blade 46 can be placed, before vulcanization, in the mould of the tyre 47 at the same time as the attaching members 48, so that, after vulcanization, a rubber tyre, internally provided with the flexible steel rim and the attaching members, is obtained, the whole constituting a single distortable block in which are attached pins 49, 50, provided with rubber rings 3 which are previously tensioned by means of removable wedges.

It then suffices to assemble the cheek members 26, 27 of the hub and to remove the wedges for terminating the assemblage of the wheel, with the spokes secured in position and tensioned.

Use may also be made of a removable wedge, if the long screw 9 shown in Fig. 1 serves as a tool which is used only for tensioning the rings 3, and which may be replaced by a short one such as the outer screw 18 (Fig. 3) when rings 3 are tensioned, so that the arms 5 and 6 can be more easily drawn together during the operation.

In this case, when the rings 3 are tensioned and before removing the screw 9 acting as a tool, wedges adapted to hold these rings 3 in a stretched condition are placed between the arms 5 and 6, the screw 18 is placed in position, and the wedges are removed.

In the above described devices, the "bracing" of the wheel, that is to say the tendency of the hub to always return in the median plane of this wheel, is due to the previous tensioning of the resilient rings 3 constituting the spokes.

When this device is fitted on vehicles running on rails for instance, it may be desirable that the hub should be rigidly held, and no longer only resiliently, in this median plane, whilst being liable of assuming a certain eccentricity relatively to the tread ring owing to the action of the resilient rings 3.

The device illustrated in Fig. 6 is adapted to satisfy this condition.

In this device, the relative displacements of the thread ring and of the hub in a direction parallel to the axis of the axle are prevented by abutments 28, 29 provided with intermediate balls 30, and respectively rigid with these two members, these abutments being so arranged as to allow them to move relatively to each other in the median plane of the wheel.

This arrangement is rendered possible by the rib 31 of the rim and the cheek members 32 of the hub 33 which prevent the ring from moving relatively to the axle, parallel to the axis of the latter. The abutments 29 provided with balls 30 and with a lubricator and carried by the cheek members 32, surround the central rib 31. This central rib is preferably interrupted by holes or recesses so arranged as to leave a passage for three pairs of ball abutments, which are moved opposite the rib 31 in a movement of rotation in the plane of the wheel.

According to the invention, this improved device is applicable to the production of wheels capable of being transformed, by removal, replacement or covering of the removable rim, so that they can run either on road or rail.

The removable rim fitted on the crown 1 may be either a railway wheel tyre, indicated at 34 in Fig. 6, or another tyre which can replace the tyre 34 or be superposed thereon when passing from rail running to road running, this second tyre (not shown) may be a pneumatic or flexible one, made of steel or rubber, hollow or solid.

The railway wheel tyre has a conical shaped tread band $d\,f$ and this in order that the flange 35 should be held at a distance from the rail, according to a known arrangement.

Fig. 7 illustrates a device provided with a flexible steel rim. In this device, attaching members 36 are laid on two steel rings 37 placed side by side at a certain distance apart.

The steel tread ring 38, which surrounds these rings 37, is laterally held stationary relatively to the latter, on one side, by an abutment 39 of the members 36, and, on the other side, by a nut 40 screwed on each member 36 after assemblage, thus preventing the ring 38 from disengaging from the rim.

When a wheel provided with a flexible steel rim adapted to run on rails is under consideration, the device previously described must be completed, as indicated in Fig. 8, on the one hand, by side balls 41 guiding the rim 42 relatively to the hub 43 and, on the other hand, by a cheek member 44 carrying the guide flange 45.

Fig. 9 illustrates a gun-carriage wheel in which the rim 51 is provided with a cheek member 52 which is rigid with the rim 51 or secured in position thereon, and a cheek member 53 which is secured by bolts, at 54, only after securing and tensioning the rings 3. The latter are thus protected by the cheek members 52 and 53 without preventing the crown of the hub 55 from moving in the plane of the wheel.

When the gun-carriage is in firing position, the effects of the flexibility of the resilient spokes must be annulled: for that purpose, at three points of the hub 55 are permanently arranged three screw jacks 56; by operating the crank 57 of said screw jacks, the latter will be caused to bear, at 58, on a projection of the rigid rim 51, and the hub will be held stationary relatively to this rim.

Fig. 10 illustrates a form of construction in which the rim 59 is provided with a pneumatic tyre 60. In order to have an access to the screws 9 controlling the attaching members 6, 7, it suffices to remove this tyre.

As shown in Fig. 11, the rim 61, having a T cross section, is provided with a median rib 62 serving both to reinforce the rim and to support spindles constituted by tubes 63. A crown of the hub 64 is also perforated with holes, the axis of which is at right angles to the plane of the wheel and receives tubes 65 on which rubber rings 3 are attached. When the casting temperature of the metal constituting the rim and hub (light alloys) allows it, the tubes 63, 65 are securely held in their correct position during moulding.

Fig. 12 shows an assembly in which the tyre 66 is a semi-pneumatic tyre, that is to say a hollow tyre, the armature of which, according to a known arrangement, is composed of two juxtaposed rings 67 and 68 having two circular ribs 69—70 imparting to the same sufficient strength for avoiding the use of a distinct rim; this arrangement leads to a minimum weight whilst ensuring the necessary functions. In Fig. 12, a few connecting bolts 71 inserted in the tubes serve to hold, by means of nuts 72, circular or annular sheet metal covering members 73 holding the rings 3 when they are placed in position; these bolts 71 also serve to clamp the ribs 69 and 70 against each other; for that purpose, two tubes 74 and 75 are threaded on these bolts and pressed against the ribs by the nuts 72.

A special device according to the invention allows of placing in position, upon assembly, or at any moment, for replacement, a previously tensioned ring 3, as shown in Figs. 13 and 14. In Fig. 14, are shown the ends of the tubes 74, 75 of Fig. 12; the ring 3 has been tensioned by spacing apart two half-tubes 77, 78 having a diameter appreciably larger than the tubes 74, 75, and farther apart than the latter; the half-tubes 77, 78 are then held apart by means of a wedge 79 on which two sheet metal members 80—81 are riveted; the wedge 79 ends into a handle 82, and the two half-tubes 77—78 are longer than the tubes 74—75, so that their ends 77'—78' project on one side.

It is obvious that when all the tubes 74—75 are in position, the ring 3 may be threaded on two of them, then, holding the ends 77'—78' of the half-tubes, the wedge 79 can be removed by means of its handle 82; the two half-tubes 77 and 78 will tightly fit against the tubes 74 and 75.

At this moment, by grasping the half-tube 77 by its extension 77' and by causing the ring 3 to turn about the tubes 74 and 75 in the same way as a transmission belt, the half-tubes 77 and 78 will fall into the empty space between the two stretched sides of the ring 3 and will be removed. The assemblage will be completed by securing the circular covering members 73 by means of the bolts 71 and nuts 72 (Fig. 12).

Fig. 15 shows how tensioned rings 3 can be secured by a wedge 83 composed of three sections and arranged between two tubes 84, 85, when the ring is a U shaped one.

This Fig. 15 shows a rim having a U cross section and comprising a ring 86 and two side cheek members 87—88 provided with projections 87'—88' extending into the ends of the tubes 85; two half-crowns 89—90 of the hub play the same part concerning the tubes 84. The half-rims and half-crowns are connected by transverse bolts— (not shown).

In Figs. 16 and 17, the rim 91, having a U cross section, is made in one piece and its cheek members are provided with inner projections 92 in the shape of hooks.

On the other hand, a hub crown 93 is provided with ribs 94 at intervals each corresponding to two locations of rings 3, with an empty space 95 between two ribs 94. Considering the tensioned ring with its wedge 96 composed of three sections and having at its upper part a tube 97 which is not longer than the interval between the cheek members of the rim 91, the ring 3 and its wedge 96 can be inserted in the empty space 95 according to the direction of the arrow 98; when the tube 97 is at the level of the empty space 99 existing between the rim and the hub, a longer rod 100 can be inserted in this tube, and the ends of this rod will finally rest against the hook-shaped projections 92; the ring is thus hung, its lower pin 101 hanging down below the ledges 102 of the hub 93; these notched ledges will receive and confine it when, at the moment the wedge 96 will be laterally removed, the pin 101 will be pulled upwardly by the resiliency of the rubber.

It is to be understood that the forms of construction described and illustrated are given by way of example only and not in a limiting sense, and that all unessential details can be modified without departing thereby from the scope of the invention.

I claim:

1. Method for connecting elastically two circular rigid parts of a wheel, such as a rim and a hub, by means of rubber rings engaged on two axles mounted each respectively on the two parts, consisting in placing each of the rubber rings in the nonstretched state upon the two axles, in spacing the two axles one from the other by means of a stretching device in such a manner as to stretch the rubber ring, in entering the stretched ring into the wheel and in withdrawing the stretching device in such a manner as to leave the stretched ring on the axles.

2. Method for connecting elastically two circular rigid parts of a wheel as claimed in claim 1, in which one part of the axles is mounted on screws fixed on one of the wheel parts, consisting in mounting the rubber rings in the nonstretched state upon the axles brought together, in shifting the outer axles by means of long screws in such a manner as to stretch said rings, in inserting keys between the axles, in substituting short fastening screws for said long screws and in withdrawing the keys.

3. Method for connecting elastically two circular rigid parts of a wheel as claimed in claim 1, in which the axles are adapted to bear upon anchoring members which are provided on the two parts of the wheel, consisting in introducing two axles in each rubber ring in the nonstretched state and outside of the wheel, in spacing apart said axles from each other by means of a stretching device, in setting said axles into engagement with the anchoring members of the wheel, in loosening the stretching device and in withdrawing it.

4. Method for connecting elastically two circular rigid parts of a wheel as claimed in claim 1, the axles of which are previously fixed on the two circular parts of the wheel, consisting in introducing two gutter-shaped members in each rubber ring, in spacing apart said gutter-shaped members for stretching the ring, in inserting a key between said members, in passing the whole of the ring, the gutter-shaped members and the key over said axles, in withdrawing the key, in giving the gutter-shaped members half a revolution around the said axles and in withdrawing said gutter-shaped members.

5. Method for connecting elastically two circular rigid parts of a wheel as claimed in claim 1, consisting in inserting two axles in each ring in the nonstretched state and outside of the wheel, in inserting between the axles an extensible key, in lengthening said key in such a manner as to stretch the rubber ring, in inserting said axles on anchoring members connected to the two parts of the wheel, in shortening the key and in withdrawing it.

EMILE RIMAILHO.